US008065157B2

(12) United States Patent
Tsuboi

(10) Patent No.: US 8,065,157 B2
(45) Date of Patent: Nov. 22, 2011

(54) AUDIO OUTPUT APPARATUS, DOCUMENT READING METHOD, AND MOBILE TERMINAL

(75) Inventor: Kazuhiro Tsuboi, Yokohama (JP)

(73) Assignee: Kyocera Corporation, Kyoto (JP)

( * ) Notice: Subject to any disclaimer, the term of this patent is extended or adjusted under 35 U.S.C. 154(b) by 860 days.

(21) Appl. No.: 11/441,602

(22) Filed: May 26, 2006

(65) Prior Publication Data

US 2006/0271371 A1 Nov. 30, 2006

(30) Foreign Application Priority Data

May 30, 2005 (JP) ................................ P2005-158213

(51) Int. Cl.
*G01L 11/00* (2006.01)

(52) U.S. Cl. ........................................................ 704/277

(58) Field of Classification Search ................... 704/277
See application file for complete search history.

(56) References Cited

U.S. PATENT DOCUMENTS 5,860,064 A 1/1999 Henton
5,918,222 A * 6/1999 Fukui et al. ................... 704/270
6,332,143 B1 12/2001 Chase
6,622,140 B1 9/2003 Kantrowitz
6,721,734 B1 4/2004 Subasic et al.
6,792,406 B1 9/2004 Fujimura et al.
6,826,530 B1 * 11/2004 Kasai et al. ................... 704/258
6,934,684 B2 * 8/2005 Alpdemir et al. ............. 704/265
7,065,490 B1 * 6/2006 Asano et al. .................. 704/275
7,222,075 B2 * 5/2007 Petrushin ...................... 704/270
7,233,900 B2 * 6/2007 Kariya .......................... 704/260
7,349,852 B2 * 3/2008 Cosatto et al. ................ 704/275
7,353,177 B2 * 4/2008 Cosatto et al. ................ 704/275
7,356,470 B2 * 4/2008 Roth et al. ..................... 704/270
7,379,871 B2 * 5/2008 Shimakawa et al. .......... 704/260
2001/0021907 A1 * 9/2001 Shimakawa et al. .......... 704/260
2003/0033145 A1 2/2003 Petrushin
2003/0163320 A1 * 8/2003 Yamazaki et al. ............ 704/270

FOREIGN PATENT DOCUMENTS

CN 1378155 A 11/2002
EP 1 071 073 1/2001
EP 1072297 A1 1/2001
EP 1113417 A2 7/2001
EP 1 282 113 2/2003
FR 2807188 A1 10/2001
JP 06083381 A 3/1994
JP 11231885 A 8/1999

(Continued)

OTHER PUBLICATIONS

Preliminary Search Report and Written Opinion issued on Aug. 20, 2007 for the counterpart French Patent Application No. 0604779 lists the references above.

(Continued)

*Primary Examiner* — Michael N Opsasnick
(74) *Attorney, Agent, or Firm* — DLA Piper LLP (US)

(57) ABSTRACT

An audio output apparatus includes an audio output unit and a storage unit which stores a predetermined word and a type associated with the word. A controller, upon outputting an electronic document as audio from the audio output unit using speech synthesis, when the electronic document contains the word stored in the storage unit, controls the audio output from the audio output unit according to the type associated with the word.

15 Claims, 7 Drawing Sheets

| EMOTION TYPE | CATEGORY | WORDS | WEIGHTED CONSTANT |
|---|---|---|---|
| DISPLEASURE | ANGER | TRY, GO, MORE, MEET, ANGER, PERSEVERE, COMPLAIN, DENY, CRITICIZE, LECTURE | 60 |
| | UNFAIR | NOT, BUT, DUNNO, BAD, DOUBT, SELFISH, POOR, MISTAKE, LOSS, WEAK, PITY | 15 |
| | HATRED | DON'T, WORST, BOTHER, BAD, TERRIBLE, HATE, CRITICISM, HINDRANCE, ENEMY, REFUSAL | 80 |
| DISAPPOINTMENT /UNEASE | SAD | IMPOSSIBLE, BLUNDER, OOPS, PITY, FAILURE, TEARS, CRY, CANNOT, GOODBYE, COULDN'T, PITY | 5 |
| | LONELY | EMPTY, NONE, MISSED, ALONE, LONELY, WAIT, CALLOUS, SETBACK, BLANK, FRUSTRATED | 20 |
| | DISAPPOINTED | ALWAYS, WHO, ANYWAY, ABSOLUTELY, LATE, POOR, EH?, POSSIBLY, COULD, UNAVOIDABLE | 40 |
| | APOLOGY | PARDON, EXCUSE, SORRY, APOLOGY, REMORSE, REGRET, INEXCUSABLE, COMPENSATE | 60 |
| HARDSHIP | PAINFUL | RISK, TROUBLE, DIFFICULT, SICK, IMPOSSIBLE, TOUGH, HARD, DIFFICULTY, UNEASY, TROUBLESOME | 80 |
| | HURT | TEST, EXAM, STRESS, ENDURE, PAIN, PAINFUL, HURT, TIRED, WORST, STRESSFUL | |
| DISAPPOINTMENT /ANNOYANCE | FEAR | INCIDENT, ACCIDENT, HURRICANE, DANGER, FEARFUL, SETBACK, CRISIS, HOSPITALIZED, PETRIFIED, COLD | 40 |
| | ANXIETY | WHY, WARNING, WHETHER, HOW, WHAT, IF, WHO, WHERE, SEEMS | 5 |
| | ANXIOUSNESS | IMMEDIATELY, SHOULD, WHAT, TROUBLE, DELAY, HURRY, BUSY, BARELY, FRUSTRATED | 20 |
| | SURPRISE | WHY, SUDDENLY, OH, SURPRISINGLY, AH, UNEXPECTED, STRANGE, WOW, JEEZ, WHOOPS | 60 |

FOREIGN PATENT DOCUMENTS

| | | | |
|---|---|---|---|
| JP | 2002041411 | A | 2/2002 |
| JP | 2002127062 | A | 5/2002 |
| JP | 2003-186897 | | 7/2003 |
| JP | 20032333388 | A | 8/2003 |
| JP | 2003302992 | A | 10/2003 |
| JP | 2004151527 | A | 5/2004 |
| JP | 2004272807 | A | 9/2004 |
| JP | 2004-289577 | | 10/2004 |
| JP | 2005-275601 | | 10/2005 |
| WO | 0241191 | A1 | 5/2002 |

OTHER PUBLICATIONS

Japanese language office action dated Mar. 22, 2011 and its English language translation for corresponding Japanese application 2006149695 cites the foreign patent documents above.

* cited by examiner

FIG. 2

| EMOTION TYPE | CATEGORY | WORDS | WEIGHTED CONSTANT |
|---|---|---|---|
| AFFECTION | LIKE | LIKEABLE, LIKE, HOBBY, LUST, CUTE, ADORABLE, CUTESY, FOND, KIND, FUN | 20 |
| | LOVE | LOVE, CUTE, AFFAIR, DATE, KISS, LOVING, LOVABLE, ROMANCE, SWEET, FIRST LOVE; | 80 |
| | DEAR | OKAY, RELATIONSHIP, FRIEND, HEY, TEACH, HI, BOYFRIEND, ANYTIME, HELLO, YO, PRESENT | 10 |
| JOY | PRAISE | BEST, PRIZE, NICE, VERY, SKILLFUL, GREAT, WIN, TALENTED, EXCELLENT, GREATEST | 50 |
| | GRATITUDE | THANKS, RECEIVE, GRATEFUL, INDEBTED, REGARDS, HEARTFELT, APPRECIATE, APPRECIATION | 30 |
| | CELEBRATION | WEDDING, SUCCESS, CONGRATULATIONS, CHRISTMAS, BIRTH, BIRTHDAY, GRADUATION, CONGRATS, LUCKY, LONG-LIVED | 80 |
| | EXCITEMENT /THRILLS | PRESENT, EXPECTATIONS, BEST, WISH, DREAM, DISCOVER, WANT, WISH, EXCITED | 70 |
| | JOYFUL | OPTIMISTIC, HOLIDAY, FUN, FUNNY, EASY, TOURISM, PLAY, ENJOY | |
| | SATISFACTION | PERFECT, BONUS, FULL, YES, WARM, SUFFICIENT, CONVENIENT, GOOD, SUPERIOR, DATE | 15 |
| COMFORT | SYMPATHY/ ENCOURAGEMENT | EXCELLENT, NATURALLY, OBVIOUSLY, SUPPORT, WELL, EFFORT, MORE, EXCELLENT, YEAH, PRESENT, HOPEFUL | 10 |
| | RELAXATION | SAFE, SECURE, PROTECTED, RELAXED, CARE, STABLE, RECOVER, REST, PEACE, PROTECTION, DATE | 5 |

FIG. 3

| EMOTION TYPE | CATEGORY | WORDS | WEIGHTED CONSTANT |
|---|---|---|---|
| DISPLEASURE | ANGER | TRY, GO, MORE, MEET, ANGER, PERSEVERE, COMPLAIN, DENY, CRITICIZE, LECTURE | 60 |
| | UNFAIR | NOT, BUT, DUNNO, BAD, DOUBT, SELFISH, POOR, MISTAKE, LOSS, WEAK, PITY | 15 |
| | HATRED | DON' T, WORST, BOTHER, BAD, TERRIBLE, HATE, CRITICISM, HINDRANCE, ENEMY, REFUSAL | 80 |
| DISAPPOINTMENT /UNEASE | SAD | IMPOSSIBLE, BLUNDER, OOPS, PITY, FAILURE, TEARS, CRY, CANNOT, GOODBYE, COULDN' T, PITY | 5 |
| | LONELY | EMPTY, NONE, MISSED, ALONE, LONELY, WAIT, CALLOUS, SETBACK, BLANK, FRUSTRATED | 20 |
| | DISAPPOINTED | ALWAYS, WHO, ANYWAY, ABSOLUTELY, LATE, POOR, EH?, POSSIBLY, COULD, UNAVOIDABLE | 40 |
| | APOLOGY | PARDON, EXCUSE, SORRY, APOLOGY, REMORSE, REGRET, INEXCUSABLE, COMPENSATE | 60 |
| HARDSHIP | PAINFUL | RISK, TROUBLE, DIFFICULT, SICK, IMPOSSIBLE, TOUGH, HARD, DIFFICULTY, UNEASY, TROUBLESOME | 80 |
| | HURT | TEST, EXAM, STRESS, ENDURE, PAIN, PAINFUL, HURT, TIRED, WORST, STRESSFUL | |
| DISAPPOINTMENT /ANNOYANCE | FEAR | INCIDENT, ACCIDENT, HURRICANE, DANGER, FEARFUL, SETBACK, CRISIS, HOSPITALIZED, PETRIFIED, COLD | 40 |
| | ANXIETY | WHY, WARNING, WHETHER, HOW, WHAT, IF, WHO, WHERE, SEEMS | 5 |
| | ANXIOUSNESS | IMMEDIATELY, SHOULD, WHAT, TROUBLE, DELAY, HURRY, BUSY, BARELY, FRUSTRATED | 20 |
| | SURPRISE | WHY, SUDDENLY, OH, SURPRISINGLY, AH, UNEXPECTED, STRANGE, WOW, JEEZ, WHOOPS | 60 |

FIG. 4

| EMOTION TYPE | CATEGORY | WORDS | WEIGHTED CONSTANT |
|---|---|---|---|
| IMPORTANCE | IMPORTANCE | ANNOUNCEMENT, IMPORTANT, CONTACT, MUST, SECRET, INSIST, CRUCIAL, MONUMENTAL, GRAVE, SIGNIFICANT | 50 |
| | REQUESTS | PLEASE, COULD, ASSISTANCE, WISH, MIND, POSSIBLY, TRY, MAY, PRESENT | 10 |
| | HURRY | HURRY, QUICKLY, EMERGENCY, FASTEST, RUSH, SPEEDILY, IMMEDIATELY, STRAIGHTAWAY, RAPIDLY | 100 |
| TROUBLE | GENDER | WIFE, FATHER, BROTHER, MASCULINE, WIDOW, FEMININE, MALE, FEMALE, GIRLISH | 5 |
| | SORROW | DEAD, WAR, DEATH, FIGHT, CRIME, VIRUS, INJURED, TERRORIST, ACCIDENT | 20 |
| | DISCRIMINATION | Four, 4, FOUR, SLAVE, SERVANT, ESKIMO, ARISTOCRAT, APARTHEID, | 30 |
| | WARNINGS | NERD, SHYLOCK, ATTACKER, CIVIL WAR, SHACKLE, ESCAPED, GEEK | 10 |
| | INSULTS | ME., GUY, FELLOW, STUMPY, CODGER, BRAT, FREAK | 40 |

FIG. 5

| | CATEGORY | WORDS | WEIGHTED CONSTANT |
|---|---|---|---|
| URGENCY LEVEL | URGENT | QUICKLY, EMERGENCY, HURRY, SPEEDILY, INSTANTLY | 1 |
| | DELAY | LATE, SLOW, DELAY, DELAYED, TOMORROW | −1 |

FIG. 7

| | EMOTION TYPE | | | | | | | | URGENCY LEVEL |
|---|---|---|---|---|---|---|---|---|---|
| | AFFECTION | JOY | COMFORT | DISPLEASURE | DISAPPOINTMENT /UNEASE | HARDSHIP | IMPORTANCE | TROUBLE | |
| PAINFUL | 0 | 0 | 0 | 15 | 5 | 80 | 0 | 0 | 0 |
| FUN | 20 | 70 | 10 | 0 | 0 | 0 | 0 | 0 | 0 |
| DATE | 80 | 15 | 5 | 0 | 0 | 0 | 0 | 0 | 0 |
| PRESENT | 10 | 70 | 10 | 0 | 0 | 0 | 10 | 0 | 0 |
| QUICKLY | 0 | 0 | 0 | 0 | 0 | 0 | 100 | 0 | 1 |
| TOTAL | 110 | 155 | 25 | 15 | 5 | 80 | 110 | 0 | 1 |

AUDIO OUTPUT APPARATUS, DOCUMENT READING METHOD, AND MOBILE TERMINAL

CROSS REFERENCE TO RELATED APPLICATION

This application claims foreign priority based on Japanese Patent application No. 2005-158213 filed on May 30, 2005, the content of which is incorporated herein by reference in its entirety.

BACKGROUND OF THE INVENTION

Field of the Invention

This invention relates to an audio output apparatus and a document reading method.

Recently, in information communication terminals (audio output apparatuses), such as mobile telephones and personal computers (PCs), attention is being given to a function for analyzing character strings in an electronic document, such as an electronic mail, and using a speech synthesis technique to convert texts in the electronic document into speech. An information communication terminal including such a function enables a user to check the contents of an electronic document (message), such as an electronic mail, by means of sound. This increases the convenience of the information communication terminals by enabling the user to, for example, check the contents of an electronic document, such as an electronic mail by means of sound, while performing another operation on a mobile telephone or a PC monitor.

However, a text-to-speech function using a conventional speech synthesis technique outputs flat sound regardless of the content of the electronic document. This lack of speech intonation makes it uncomfortable for a user to listen to. To solve this problem, Japanese Unexamined Patent Application, First Publication No. 2004-289577 discloses a technique whereby, when transmitting an electronic mail from a sender mobile communication terminal, such as a mobile telephone, to a recipient mobile communication terminal, emotion identification information is appended to the electronic mail in accordance with its contents.

However, the aforementioned technique has shortcomings in that appending the emotion identification information to the electronic mail increases the data size of the electronic mail, and the user may be charged more fees for using electronic mail the data size of which increases. Moreover, when the emotion identification information is appended to a header of an electronic mail, the mail service system must be modified for being accommodated to this change of the header, requiring considerable network modification.

Another issue is that, if the mobile sender communication terminal is not equipped with a function for appending the emotion identification information, the recipient mobile communication terminal cannot determine any emotion.

The present invention has been made in consideration of the above problems, and the object thereof is to realize an audio output apparatus and a document reading method which include a text-to-speech function with a highly conventional emotional expression.

SUMMARY OF THE INVENTION

To achieve the aforementioned objects, this invention provides an audio output apparatus including: an audio output unit which outputs an audio, a storage unit which stores predetermined words and types associated with the words, and a controller which, upon outputting an electronic document as an audio from the audio output unit, when the electronic document contains the word stored in the storage unit, controls the audio output from the audio output unit according to the type associated with the word.

A first aspect of the present invention provides an audio output apparatus comprising: an audio output unit which outputs an audio; a storage unit which stores a predetermined word and a type associated with the word; a controller which, upon outputting an electronic document as an audio from the audio output unit using a speech synthesis, when the electronic document contains the word stored in the storage unit, controls the audio output from the audio output unit according to the type associated with the word.

BRIEF DESCRIPTION OF THE DRAWINGS

FIG. 2 is a first example of an emotion type determination table according to an embodiment of this invention;

FIG. 3 is a second example of an emotion type determination table according to an embodiment of this invention;

FIG. 4 is a third example of an emotion type determination table according to an embodiment of this invention;

FIG. 5 is an example of an urgency level determination table according to an embodiment of this invention;

FIG. 7 is an example of an emotion type determining method and an urgency level determining method according to an embodiment of this invention.

DESCRIPTION OF THE PREFERRED EMBODIMENT

Hereinafter, embodiments according to the present invention will be described with reference to the appended figures.

Figure 1:
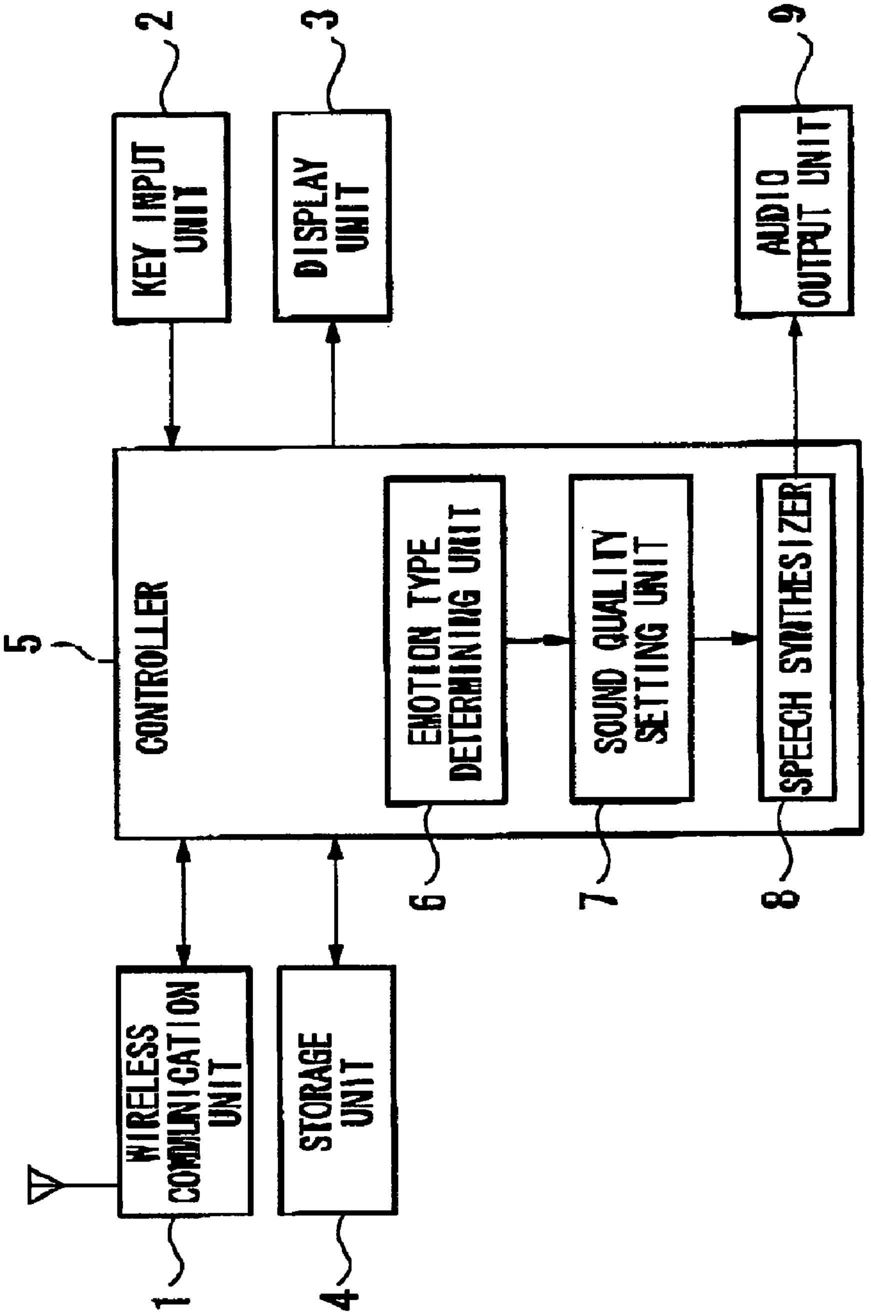
FIG. 1 is a block diagram illustrating a configuration of a mobile communication terminal according to an embodiment of this invention.

As an example of an audio output apparatus, the explanation of this embodiment describes a mobile communication terminal, for example a mobile telephone and the like, which is equipped with a function for transmitting and receiving electronic mails (messages). FIG. 1 is a block diagram illustrating a functional configuration of a mobile communication terminal according to an embodiment of this invention. As shown in FIG. 1, the mobile communication terminal includes a wireless communication unit 1, a key input unit 2, a display unit 3, a storage unit 4, a controller 5, and an audio output unit 9. The controller 5 includes an emotion type determining unit 6, a sound quality setting unit 7, and a speech synthesizer 8 as its functional configuration elements.

The wireless communication unit 1 is controlled by the controller 5, and uses a predetermined communication technique, such as a code division multiple access (CDMA) technique, to exchange audio signals and data signals, such as electronic mails, via wireless communications with a mobile communication base station. The key input unit 2 includes dial key buttons, function key buttons, a power key button, and the like, and outputs operation statuses of these buttons as operation signals to the controller 5. The display unit 3 comprises, for example, a liquid crystal display apparatus which displays various types of messages, telephone numbers, images, and so on, based on display signals input from the controller 5.

The storage unit 4 stores beforehand control programs executed by the controller 5. In addition, the storage unit 4 is configured to sequentially store various types of data, such as telephone numbers and electronic mail addresses, under the control of the controller 5, and to output these data to the controller 5 in response to requests from the controller 5. The storage unit 4 also stores emotion type determination tables, such as those shown in FIGS. 2 to 4. As shown FIGS. 2 to 4, the emotion type determination tables list categories for each emotion type (affection, joy, comfort, displeasure, disappointment/unease, hardship, disappointment/annoyance, importance, and trouble), with words and weighted constants being stored for each category. The storage unit 4 also stores an urgency level determination table which stores categories relating to urgency levels, with words and weighted constants defined for each category, as shown in FIG. 5.

The controller 5 is configured to control the overall operation of the mobile communication terminal according to the predetermined control programs stored beforehand in the storage unit 4, operation signals input from the key input unit 2, the communication status of the wireless communication unit 1, or the like. As characteristic control processing based on the control program, the controller 5 processes text data of the main text of an electronic mail received by the wireless communication unit 1 using the emotion type determining unit 6 and the speech synthesizer 8.

The emotion type determining unit 6 compares the text data of the main text of the electronic mail with the emotion type determination table, extracts words corresponding to each emotion type from the text data, determines a sum of the weighted constant assigned to each word, determines the emotion type from the sum, and outputs an emotion type signal indicating the emotion type to the sound quality setting unit 7. The emotion type determining unit 6 compares the text data with the urgency level determination table stored in the storage unit 4, extracts the corresponding words, determines the urgency level from the sum of the weighted constants assigned in the words, and outputs an urgency level signal indicating the urgency level to the sound quality setting unit 7. This processing operation of the emotion type determining unit 6 will be explained in detail later.

Based on the emotion type signal (i.e. the emotion type) sent from the emotion type determining unit 6, the sound quality setting unit 7 sets the sound quality (pitch, volume, and intonation of speech) for reading an electronic mail, sets a reading speed for speech based on the urgency level signal (i.e. the urgency level), and outputs information related to the sound quality as speech setting information to the speech synthesizer 8.

Based on the sound quality information, the speech synthesizer 8 converts the text data of the electronic mail to synthesized speech data, and outputs an audio signal representing this synthesized speech data to the audio output unit 9. That is, the synthesized speech data is synthesized such that the electronic mail is read according to the urgency level and the emotion type determined by the emotion type determining unit 6. The audio output unit 9 includes, for example, a speaker which converts the audio signal input from the speech synthesizer 8 to sound and outputs it to the outside.

Figure 6:
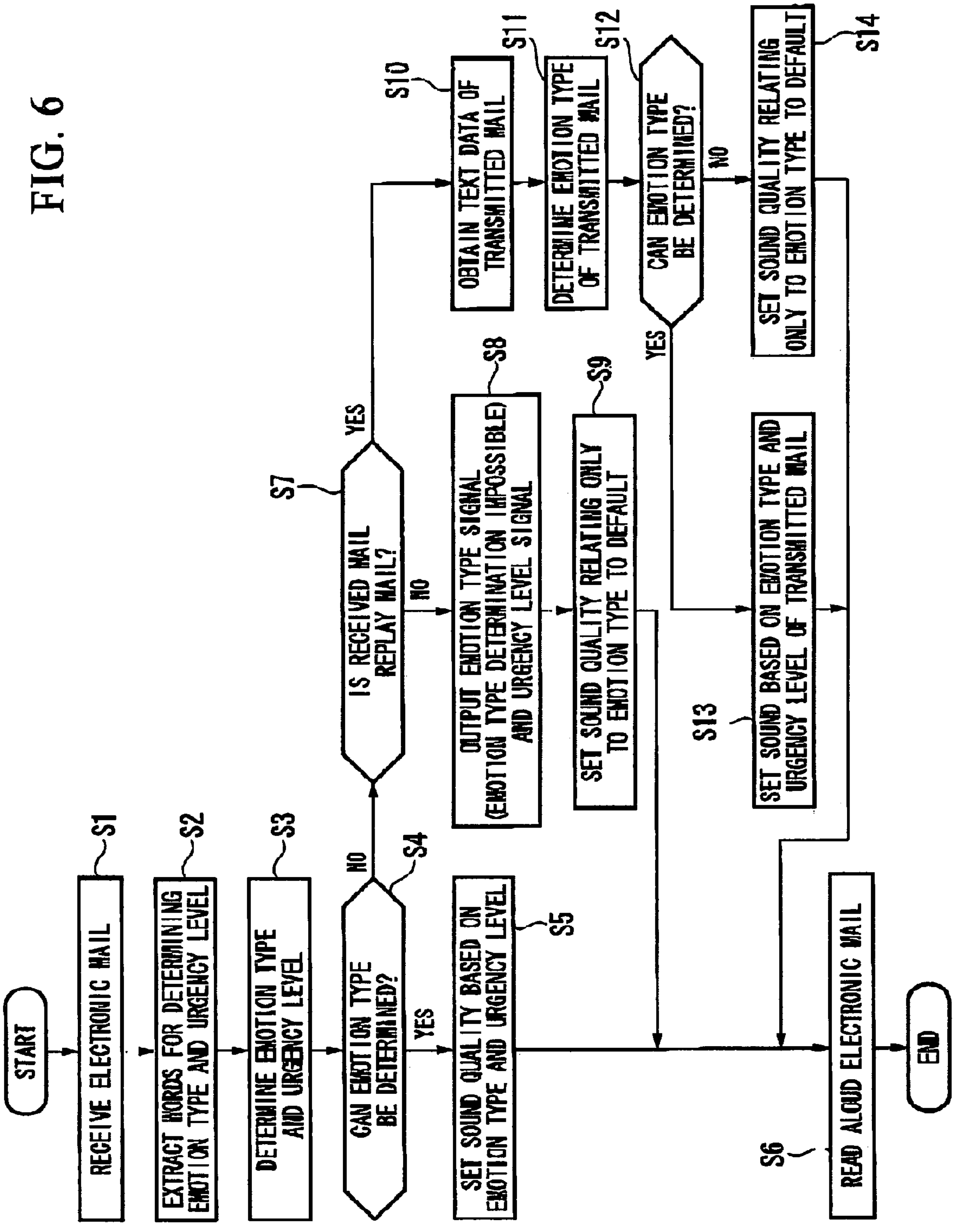
FIG. 6 is a flowchart of text-to-speech conversion processing of electronic mails by a mobile communication terminal according to an embodiment of this invention.

Next, the text-to-speech conversion processing of electronic mails in a mobile communication terminal configured as described above will be explained using the flowchart of FIG. 6.

In step S1, the mobile communication terminal (specifically, the wireless communication unit 1) receives an electronic mail from another mobile communication terminal via a mobile communication base station. In this example, the received electronic mail (received mail) include text data of "after such a long hard time, finally we are meeting for a fun date. I have a present for you, so come quickly." The text data may include the title of the electronic mail in addition to the main text thereof.

In step S2 of FIG. 7, the emotion type determining unit 6 in the controller 5 extracts words corresponding to each emotion type and the urgency level (in this case, "hard", "fun", "date", "present", and "quickly" are extracted) from the text data of the received mail according to the emotion type determination table and the urgency level determination table stored in the storage unit 4. In step S3, the emotion type determining unit 6 determines the sum of the weighted constants assigned to the words as a sum (count value), and determines the emotion type and urgency level. For example, in FIG. 2, the word "fun" corresponds to the category "like" of the emotion type "affection", and the weighted constant for "affection" is "20", "fun" also corresponds to the category "joyful" related to the emotion type "joy", and the weighted constant is "70". As shown in FIG. 5, the word "quickly" corresponds to the urgency level category "urgent" and its weighted constant is "1".

The emotion type determining unit 6 executes similar processing to fill in the table of FIG. 7 for each of the other words, and thereby calculates the sum of the weighted constants related to the emotion types and the urgency level. As shown in FIG. 7, since the largest sum of weighted constants in this embodiment is that related to the emotion type "joy", the emotion type determining unit 6 determines "joy" as the emotion type of the received mail and "1" as its urgency level.

The emotion type determining unit 6 then determines whether an emotion type can be determined in step S4. If the largest sum of weighted constants calculated in step S2 is known, the emotion type can be determined in step S3. Therefore, the determination in step S4 is "Yes" and the emotion type determining unit 6 outputs an emotion type signal representing "joy" as the emotion type of the received mail and an urgency level signal representing "1" as its urgency level to the sound quality setting unit 7. In step S5, the sound quality setting unit 7 sets the pitch, volume, and intonation of speech according to the emotion type "joy", sets the reading speed according to the urgency level "1", and outputs this information as sound quality setting information to the speech synthesizer 8. The larger the value representing the urgency level is, the faster the reading speed becomes; the smaller the value, the slower the reading speed.

In step S6, based on the sound quality setting information, the speech synthesize 8 converts the text data of the received mail to synthesized speech data and outputs it as an audio signal to the audio output unit 9. The audio output unit 9 converts the audio signal to sound and outputs it to the outside. This enables the received mail to be read aloud as an emotional speech.

There are cases where the maximum value cannot be determined among the total weighted constants related to the emotion types in step S3; that is, where there exists a plurality of emotion types with two or more categories whose sums are equal and are largest compared to other categories. Since it is difficult to determine the emotion type of the received mail in such cases, the emotion type determining unit 6 determines in step S4 that an emotion type cannot be determined for such received mails, and proceeds to step S7.

In step S7, the emotion type determining unit 6 checks whether a transmission history corresponding to the received mail is stored in the storage unit 4. That is, in step S7, it is determined whether the received mail is a reply mail to an electronic mail which was transmitted from the mobile communication terminal to another mobile communication terminal (transmitted mail).

If a determination of "No" is made in step S7 (i.e. if the received mail is not a reply mail to a transmitted mail send from the mobile communication terminal), in step S8, the emotion type determining unit 6 outputs an emotion type signal indicating that an emotion type cannot be determined and an urgency level signal indicating the urgency level of the received mail to the sound quality setting unit 7.

When the emotion type determining unit 6 determines that no emotion type can be determined for the received mail, in step S9, the sound quality setting unit 7 selects a standard setting (default setting), which does not express emotion as the speech setting information, and outputs it to the speech synthesizer 8. This default setting uses only a setting related to an emotion type as the standard setting, the urgency level being set according to the urgency level of the received mail. In step S6, based on the default settings, the speech synthesizer 8 converts the text data of the received mail to synthesized speech data and outputs it as an audio signal to the audio output unit 9. The audio output unit 9 converts the audio signal to sound and outputs it to the outside. Thus, when it is determined that an emotion type cannot be determined for a received mail and the received mail is not a reply mail, text-to-speech conversion is performed without emotional expression.

On the other hand, when a determination of "Yes" is made in step S7, that is, when the received mail is a reply mail to a mail transmitted from the mobile communication terminal, such as when the received mail has the same mail title as a mail retained in the history of transmitted mails, in step S10, the emotion type determining unit 6 obtains the text data of the transmitted mail stored in the transmitted mail folder of the storage unit 4 as a related message and, in step S11, determines an emotion type and an urgency level of the transmitted mail based on the text data thereof. The processing to determine the emotion type and the urgency level is the same as that of step S3 and will not be explained further. In step S12, the emotion type determining unit 6 determines whether and emotion type can be determined for the transmitted mail.

If a determination of "Yes" is made in step S12, that is, if it is determined that an emotion type can be determined for the transmitted mail, the emotion type determining unit 6 outputs an emotion type signal indicating an emotion type and an urgency level signal indicating an urgency level of the transmitted mail to the sound quality setting unit 7. In step S13, the sound quality setting unit 7 sets the pitch, volume, and intonation of speech according to the emotion type of the transmitted mail, sets the reading speed according to the urgency level of the transmitted mail, and outputs this information as sound quality setting information to the speech synthesizer 8.

In step S6, based on the sound quality setting information, the speech synthesizer 8 converts the text data of the received mail to synthesized speech data and outputs it as an audio signal to the audio output unit 9, which converts the audio signal to sound and outputs it to the outside. This enables the received mail to be read aloud as an emotional speech. Thus even if an emotion type cannot be determined for the received mail, if the received mail is a reply mail to a transmitted mail transmitted from the mobile communication terminal, since there is a high possibility that the transmitted mail and the reply mail, being related messages, have the same emotion types, the received mail can be given emotional expression and text-to-speech conversion can be performed by referring to the emotion type of the transmitted mail.

On the other hand, when a determination of "No" is made in step S12, that is, if it is determined that an emotion type cannot be determined for the transmitted mail, the emotion type determining unit 6 outputs an emotion type signal indicating that an emotion type cannot be determined and an urgency level signal indicating an urgency level of the received mail (reply mail) to the sound quality setting unit 7.

When it is determined that an emotion type cannot be determined for the transmitted mail in this way, in step S14, the sound quality setting unit 7 selects a standard setting (default setting) which does not express emotion as the speech setting information, and outputs it to the speech synthesizer 8. This default setting uses only a setting related to an emotion type as the standard setting, an urgency level setting being made according to the urgency level of the received mail. In step S6, based on the default setting, the speech synthesizer 8 converts the text data of the received mail to synthesized speech data, and outputs it as an audio signal to the audio output unit 9, which converts the audio signal to sound and outputs it to the outside. Thus, when it is determined that the received mail is a reply mail and that emotion types cannot be determined for the reply mail and the transmitted mail, text-to-speech conversion is performed without emotional expression.

In steps S11 to S14, an urgency level may be determined from the time interval between the transmission time of the transmitted mail and the reception time of the reply mail which is transmitted in reply to the transmitted mail, and the reading speed may be changed in accordance with that urgency level. For example, when the time interval is long, a low urgency level is determined and the reading speed is set to a slow speed. Conversely, when the time interval is short, a high urgency level is determined and the reading speed is set to a fast speed.

As described above according to this embodiment, since the information communication terminal (audio output apparatus) which receives an electronic mail (message) determines the emotion type of that received mail, an emotional text-to-speech conversion can be performed without providing the communication terminal sending information with a function for appending emotion type information. Furthermore, there is no need to input emotion type information every time the user transmits an electronic mail. Moreover, since a header of an electronic mail is not used, it is not necessary to change the mail service system, whereby the mail usage cost for users can be reduced. According to this embodiment, a mobile communication terminal including a text-to-speech function which is capable of expressing emotions can be made more convenient.

The present invention is not limited to the embodiment described above, and modifications such as the following are conceivable.

While in the aforementioned embodiment, weighted constants of emotion types associated with each word extracted from the electronic mail (electronic document) are counted and an emotion type of the electronic mail is determined based on the maximum value of the sum (count value) of the weighted constants of each emotion type, which is not to be considered as limiting the present invention. It would be acceptable to count occurrences of words used in the electronic mail (electronic document) for each emotion type and determine the emotion type of the electronic mail according to the emotion type having the highest count value.

While the aforementioned embodiment is embodied in a mobile communication terminal, this is not to be considered as limiting the present invention. The electronic mail reading unit of the invention can also be applied in an information communication terminal, such as a personal computer which transmits and receives electronic mails using a communication unit.

While the aforementioned embodiment is described using an emotion type determination table and an urgency level determination table, such as those in FIGS. 2 to 4 and FIG. 5, these are merely examples and are not limiting the present invention. It is of course possible to set other emotion types, and other words, and the like in correspondence with them.

While in the aforementioned embodiment, based on the emotion type and the urgency level of the electronic mail, text-to-speech conversion is performed, characters, animations, and the like, corresponding to the emotion type and the urgency level may also be displayed on the display unit 3.

While the aforementioned embodiment has been described using an example of speech synthesis of an electronic mail, the invention is not limited to this and can be applied for any other types of electronic documents having text data. In addition to electronic mails, the invention can be similarly used in relation to messages that are transmitted and received via online chat and the like using a short message service, push-to-talk (PTT) technique, and the like, and also when browsing websites and the like on the Internet.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An audio output apparatus comprising:

an audio output unit which outputs an audio;

a storage unit which stores a predetermined word and a type in an associated manner, the type being used to control an audio output of the predetermined word from the audio output unit;

a controller which, upon outputting an electronic document as an audio from the audio output unit using speech synthesis, when the electronic document contains the word stored in the storage unit, controls the audio output of the predetermined word from the audio output unit according to the type stored in a manner associated with the word, wherein the type includes a plurality of categories, and the predetermined word associates with a category.

2. The audio output apparatus according to claim 1, wherein the storage unit stores a plurality of words associated with different types, and when the electronic document contains a plurality of any of the words associated with the different types, the controller determines occurrences of the words used in the electronic document for each type and controls the audio output from the audio output unit according to a type having the greatest occurrence.

3. The audio output apparatus according to claim 2, wherein, upon determining the occurrence, when there is a plurality of types having the greatest occurrence, the controller outputs a standard audio output.

4. The audio output apparatus according to claim 1, wherein the storage unit stores weighted constants for the categories, and when the electronic document contains a plurality of any of the words associated with different categories, the controller calculates a sum of the weighted constants of the categories of the words used in the electronic document for each type, and controls the audio output from the audio output unit according to the category having the largest sum.

5. The audio output apparatus according to claim 1, wherein the storage unit stores emotion types as the types associated with the words, and the controller controls a sound quality of the audio output according to the emotion types.

6. The audio output apparatus according to claim 1, wherein the storage unit stores urgency levels as the types associates with the words, and the controller controls a reading speed of the audio output according to the urgency levels.

7. The audio output apparatus according to claim 1, further comprising a communication unit which connects to a communication network and transmits and receives messages, wherein when outputting in an audio a first message which is an electronic document, the controller controls the audio output from the audio output unit according to a type associated a second message which is related to the first message.

8. The audio output apparatus according to claim 1, further comprising a communication unit which connects to a communication network and transmits and receives messages, wherein, when outputting in an audio a first message which is an electronic document, if the first message and a second message are mutually related by a transmission/reception relationship, the controller controls the audio output in accordance with a time interval between the time when the first message was generated and the time when the second message was generated.

9. The audio output apparatus according to claim 1, wherein, when controlling the audio output, the controller controls at least one of a pitch, a volume, and an intonation of the sound.

10. The audio output apparatus according to claim 1, further comprising a display unit which displays the electronic document.

11. A document reading method in an audio output apparatus comprising an audio output unit which outputs an audio, the method comprising the steps of:

storing predetermined words and types in an associated manner, the types being used to control an audio output of the predetermined word from the audio output unit; and outputting in an audio an electronic document from the audio output unit using speech synthesis; wherein, when the electronic document contains any of the words stored in the storing step, the audio output of the predetermined word from the audio output unit is controlled according to the type stored in a manner associated with the word, wherein the type includes a plurality of categories, and the predetermined word associates with a category.

12. A mobile terminal, comprising:

a communication unit which connects to a communication network and sends and/or receives data for an electronic document;

a speech synthesizer for converting text in the electronic document, which is sent and/or received by communication unit, to speech;

an audio output unit which outputs an audio for the speech converted by the speech synthesizer;

a storage unit which stores a predetermined word and a type in an associated manner, the type being used to control an audio output of the predetermined word from the audio output unit;

a controller which, upon outputting the electronic document as an audio from the audio output unit, when the electronic document contains the word stored in the storage unit, controls the audio output of the predetermined word from the audio output unit according to the type stored in a manner associated with the word, wherein the type includes a plurality of categories, and the predetermined word associates with a category.

13. A mobile terminal according to claim 12, wherein the storage unit stores emotion types as the types associated with the words, and the controller controls a sound quality of the audio output according to the emotion types.

14. A mobile terminal according to claim 12, wherein the storage unit stores urgency levels as the types associates with the words, and the controller controls a reading speed of the audio output according to the urgency levels.

15. A mobile terminal according to claim 12, further comprising a display unit which displays the electronic document.

* * * * *